United States Patent Office 3,519,603
Patented July 7, 1970

3,519,603
CURABLE MIXTURES OF DIEPOXY COMPOUNDS, DISECONDARY AMINES, AND POLYAMINES CONTAINING AT LEAST 3 ACTIVE HYDROGEN ATOMS LINKED TO NITROGEN
Friedrich Lohse, Allschwil, Rolf Schmid, Muenchenstein, and Hans Batzer, Arlesheim, Switzerland, assignors to Ciba Limited, Basel, Switzerland, a company of Switzerland
No Drawing. Filed May 28, 1968, Ser. No. 732,560
Claims priority, application Switzerland, June 8, 1967, 8,128/67; Aug. 9, 1967, 11,217/67
Int. Cl. C08g 30/08, 30/14
U.S. Cl. 260—47                                                           19 Claims

ABSTRACT OF THE DISCLOSURE

A curable epoxy resin mixture suitable for use as casting, impregnating or laminating resin, as binder, coating or sealing composition, characterized in that it contains (I) a diepoxy compound containing two 1,2-epoxyethyl residues, (II) a di-secondary diamine of the formula

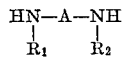

in an amount of 0.3 to 0.9, preferably 0.5 to 0.8, equivalent of active hydrogen atoms linked with nitrogen for every equivalent of epoxide groups of the diepoxy compound (I), and in this formula $R_1$ and $R_2$ each represents an unsubstituted or alkylated saturated carbocycle or a ring system containing at least 5 cyclic carbon atoms, and A represents an unsubstituted or alkylated polymethylene residue which may be interrupted by ether oxygen atoms and which contains in the linear chain directly connecting the two secondary nitrogen atoms at least 4 and preferably at least 6 carbon atoms, and (III) a polyamine, which contains at least 3 active hydrogen atoms linked with nitrogen, in an amount of 0.2 to 0.8, preferably 0.4 to 0.6, equivalent of active hydrogen atoms linked with nitrogen for every epoxide equivalent of the diepoxy compound (I).

---

It is known that epoxy resins can be cured with aliphatic or cycloaliphatic polyamines. Such resin+curing agent systems are in general distinguished by a relatively low curing temperature which is decisive for many applications and the cured resin+curing agent mixtures display quite good mechanical strength. With these known epoxy resin+amine curing agent systems it is also possible to manufacture cured, shaped structures having a high flexibility. However, it has not been possible in the past to combine the high strength values with a high stretchability, that is to say to obtain tough, shaped structures that combine a high tensile strength wih a high elongation at rupture. Moreover, the processing properties are often extensively impaired by the relatively high viscosity of the epoxy resin+amine curing agent mixture and the resulting short pot life.

The present invention is based on the observation that flexibilized epoxy resin mixtures are obtained, which at worst involve the disadvantages of the hitherto known resin systems based on epoxy resins and polyamines only to a minor degree, by using as curing agent in specific proportions combinations of polyamines containing at least 3 amine-hydrogen atoms with certain mixed aliphatic-cycloaliphatic disecondary diamines, in which the two secondary nitrogen atoms are separated from each other by a polymethylene chain of at least 4 carbon atoms and in which, furthermore, the two secondary nitrogen atoms are substituted by a cycloaliphatic ring containing at least 5 cyclic carbon atoms. The new epoxy resin+curing agent systems can as a rule be fully cured at a temperature of 100° C. or below and have, compared with the known systems, a relatively low viscosity and especially a surprisingly long pot life (relatively slow rise in viscosity as a function of the time). The resulting shaped structures are distinguished by surprisingly high strength values and high elongation at rupture.

Accordingly, the present invention provides curable epoxy resin mixtures suitable for use as casting, impregnating and laminating resins, as binders, coating compositions and sealing compositions, characterized in that they contain (I) a diepoxy compound containing two 1,2-epoxyethyl residues, (II) a disecondary diamine of the formula (1)    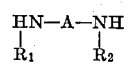

in an amount of 0.3 to 0.9, preferably 0.5 to 0.8, equivalent of active hydrogen atoms bound to nitrogen for every equivalent of epoxide groups of the diepoxy compound (I) and in this formula $R_1$ and $R_2$ each represents an unsubstituted or alkylated saturated carbocycle or a cyclic system containing at least 5 cyclic carbon atoms, and A represents an unsubstituted or alkylated polymethylene residue which may be interrupted by ether oxygen atoms, which contains in the linear chain directly linking the two secondary nitrogen atoms at least 4 and preferably at least 6 carbon atoms, and (III) a polyamine containing at least 3 active hydrogen atoms bound to nitrogen in an amount of 0.2 to 0.8, preferably 0.4 to 0.6 equivalent of active hydrogen atoms linked with nitrogen for every epoxide equivalent of the diepoxy compound (I).

Suitable diepoxy compounds (I), containing two 1,2-epoxyethyl residues

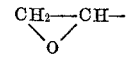

are, for example, butadiene diepoxide and divinylbenzene diepoxide.

Those diepoxy compounds (I) are preferred which contain two glycidyl groups.

There may be used, for example, basic polyepoxy compounds obtained by reacting primary aromatic monoamines such as aniline or toluidine, or secondary aromatic diamines such as 4,4'-di-(mono-methylamino)-diphenylmethane, with epichlorohydrin in presence of alkali; furthermore diglycidyl compounds obtained by reacting epichlorohydrin with heterocyclic nitrogen bases such as hydantoin, 5,5-dimethylhydantoin, parabanic acid, ethyleneurea, for example N,N'-diglycidyl-5,5-dimethylhydantoin. It is also advantageous to use diglycidyl ethers or diglycidyl esters.

Preferred diglycidyl esters are those obtained by reacting a dicarboxylic acid with epichlorohydrin or dichlorohydrin in presence of an alkali. Such diesters may be derived from aliphatic dicarboxylic acids such as succinic, adipic or sebacic acid, from aromatic dicarboxylic acids such as phthalic, isophthalic or terephthalic acid, or especially from hydroaromatic dicarboxylic acids such as tetrahydrophthalic, hexahydrophthalic or 4-methylhexahydrophthalic acid. There may be mentioned, for example, digylcidyl adipate, diglycidyl phthalate, diglycidyl terephthalate, diglycidyl tetrahydrophthalate and digilycidyl hexahydrophthalate.

Preferred diglycidyl ethers are those obtained by etherifying a dihydric alcohol or diphenol with epichlorohydrin or dichlorohydrin in presence of alkali. These compounds may be derived from glycols such as ethyleneglycol, diethyleneglycol, triethyleneglycol, 1,3-propyleneglycol, 1,4-butanediol, 1,5-pentanediol, -1,6-hexanediol, nitrogenous dialcohols, such as N-phenyldiethanolamine and especially from diphenols such as resorcinol, pyrocatechol, hydroquinone, 1,4-dihydroxynaphthalene, bis(p-hydroxyphenyl)methane, bis(p-hydroxyphenyl)methylphenylmethane, bis(p-hydroxyphenyl)tolylmethane, 4,4'-dihydroxydiphenyl, bis(p-hydroxyphenyl)sulphone or preferably from bis(p-hydroxyphenyl)dimethylmethane.

There may be mentioned, for example, 1,4-butanediol diglycidyl ether, resorcinol diglycidyl ether and especially the diglycidyl ethers derived from bis(p-hydroxyphenyl)dimethylmethane (bisphenol A), which correspond to the average formula (2a)
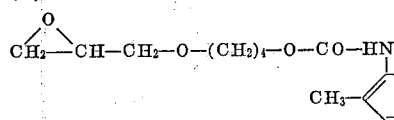

(2b)
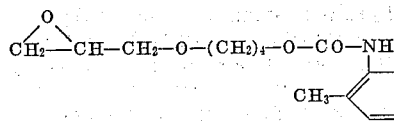

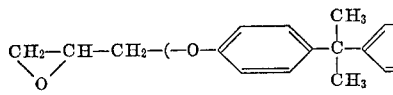

in which z is a whole or fractional small number, for example from 0 to 2.

(2c)
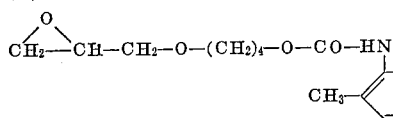

Particularly advantageous results have been obtained with diepoxy compounds of the following constitution (2)
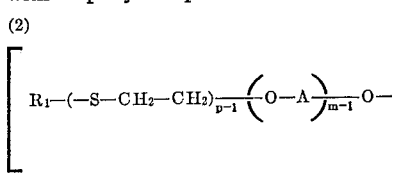

in which n is an integer of at least 2, preferably 2 or 3; X represents an oxygen or a sulphur atom; R stands for (2d)
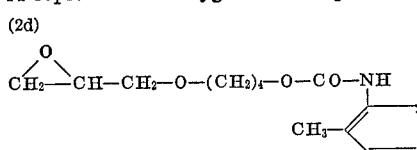

a monovalent aliphatic residue which may be interrupted by oxygen or sulphur atoms or carboxylic acid ester groups; $R_1$ represents an aliphatic residue containing a terminal 1,2-epoxyethyl group, which may be substituted by halogen atoms or interrupted by oxygen or sulphur atoms, or is preferably a 2,3-epoxypropyl group or a glycidyl group; A represents the residue of a glycol, polyglycol, thiodiglycol or poly(thiodiglycol) from which the terminal hydroxyl groups have been removed; $m=1$ or 2 and $p=1$ or 2, preferably 1, or mixtures of such diepoxy compounds with the aforementioned diglycidyl compounds.

(2e)
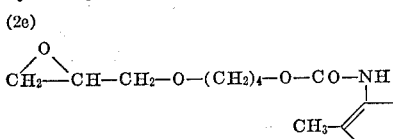

As typical representatives of the type of compound of Formula 2 there may be mentioned, for example, the compounds of the following formulae:

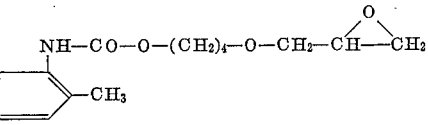

(where $G_1$ is the residue of a polyethyleneglycol $$HO-G_1-OH$$

of average molecular weight 412, from which the terminal hydroxyl groups have been removed).

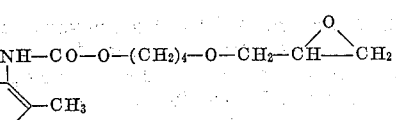

(where $G_2$ is the residue of polybutyleneglycol $$HO-G_2-OH$$

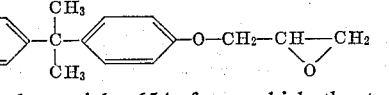

of average molecular weight 654, from which the terminal hydroxyl groups have been removed).

(where $G_3$ is the residue of polybutyleneglycol $$HO-G_3-OH$$

of average molecular weight 980, from which the terminal hydroxyl groups have been removed).

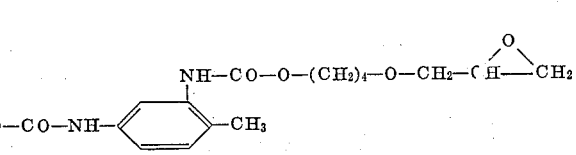

(where $G_4$ is the residue of polypropyleneglycol $$HO-G_4-OH$$

of average molecular weight 440, from which the terminal hydroxyl groups have been removed).

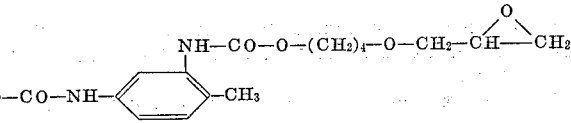

(where $G_5$ is the residue of polypropyleneglycol $$HO-G_5-OH$$

of average molecular weight 874, from which the terminal hydroxyl groups have been removed).

(2f)

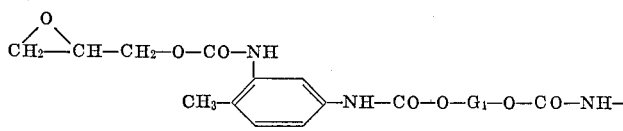

(where $G_1$ is the residue of a polyethyleneglycol of average molecular weight 412, from which the terminal hydroxyl groups have been removed).

(2g)

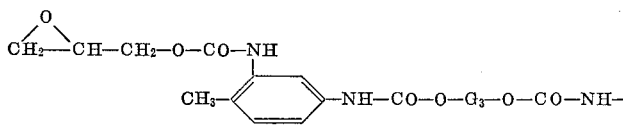

(where $G_3$ is the residue of a polyethyleneglycol of average molecular weight 980, from which the terminal hydroxyl groups have been removed).

When mixtures of this invention, containing as diepoxide component a compound of the Formula 2, were cured, shaped structures were obtained which had an extremely high toughness; combined with tensile strengths of 1.0 to 2.0 kg./mm.$^2$ elongations at rupture of 200 to 800% were achieved. In addition the notch strength values were considerably higher than those of conventional epoxy resin+amine curing agent systems.

Diglycidyl compounds very suitable for the purposes of this invention are also the adducts, still containing terminal glycidyl groups, of a stoichiometric excess of conventional diglycidyl compounds, such as bisphenol A-diglycidyl ethers, hexa- and tetrahydophthalic acid diglycidyl esters and an acid aliphatic polyester containing terminal carboxyl groups.

Suitable polyesters are, for example, condensates of adipic or sebacic acid with 1,4-butanediol, 1,6-hexanediol or neopentylglycol, which contain terminal carboxyl groups. These adducts are obtained by reacting such acid polyesters with a diglycidyl compound, the latter being used in excess. By curing mixtures of this invention containing such adducts as diepoxy compound shaped structures having considerable toughness are obtained.

The disecondary diamines of the Formula 1 used as curing agent component (II) in the resin+curing agent mixtures of this invention are most readily accessible by reacting 1 mol of a diprimary diamine of the formula (3)    $H_2N—A—NH_2$ with a ketone of the formula (4)    

to form the Schiff's base of the formula (5)    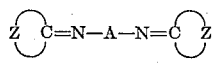

which is then hydrogenated to furnish the disecondary diamine of the Formula 1. In the above Formulae 3, 4 and 5, A has the same meaning as in Formula 1 and Z, together with the carbon atom linked by a double bond with oxygen or nitrogen respectively, forms a saturated or olefinically unsaturated carbocyclic ring or ring system containing at least 5 cyclic carbon atoms, which may be substituted by alkyl side-chains.

Diprimary amines of the Formula 3 suitable for the synthesis of the disecondary diamines of the Formula 1 are, for example, tetramethylenediamine, pentamethylenediamine and especially those which contain more than 6 carbon atoms in the carbon chain which links the primary amino groups, such as 1,12-diaminododecane and especially hexamethylenediamine and commercial trimethylhexamethylenediamine (isomer mixture of 2,2,4-trimethyl-hexamethylenediamine and 2,4,4-trimethyl-hexamethylenediamine).

As cycloaliphatic ketones (4) which may be condensed with the diprimary diamines of the Formula 3 to furnish the Schiff's base (5) there may be mentioned, for example, camphor, carvone, menthone, isophorone (=1,1,3-trimethylcyclohexen-3-one-5), methylcyclopentanone, cyclopentanone, methylcyclohexanone and especially cyclohexanone.

From among disecondary diamines of the Formula 1 there may be mentioned

N,N'-di(cyclopentyl)hexamethylenediamine,
N,N'-di(cyclohexyl)-2,2,4-trimethyl-hexamethylenediamine,
N,N'-di(cyclohexyl)-2,4,4-trimethyl-hexamethylenediamine, and more especially
N,N'-di(cyclohexyl)-hexamethylenediamine.

Furthermore, there may be used as curing agent component (II) in the resin+curing agent mixtures of this invention also disecondary diamines obtained by reacting cycloaliphatic amines with glycols under hydrogenating conditions according to the following scheme:

$$HO—A_1—OH + 2H_2N—R_1$$
$$\Big\downarrow \begin{array}{l} H_2/\text{Raney-nickel} \\ -H_2O \end{array}$$
$$R_1NH—A_1—NH—R_1$$

in which $A_1$ represents a residue of a polyalkyleneglycol left on elimination of the terminal hydroxyl groups and $R_1$ represents an unsubstituted, saturated carbocycle or ring system containing at least 5 endo-cyclic carbon atoms.

From among the polymers of alkyleneglycols of the formula $HO—A_1—OH$ suitable as starting materials for use in this variant of the process there may be mentioned, for example, diethyleneglycol, triethyleneglycol, dipropyleneglycol, tripropyleneglycol, dibutyleneglycol, tributyleneglycol and higher polymers, especially polypropyleneglycols and polybutyleneglycols.

As cycloaliphatic amines which react with the glycols under hydrogenating conditions there may be used, for example, the following:

Camphyl- and dihydrocamphylamine, carvyl-, dihydro- and tetrahydrocarvylamine, 3,3,5-trimethylcyclohexylamine, methylamine, methylcyclopentylamine, cyclopentylamine, methylcyclohexylamine and especially cyclohexylamine.

The polyamines containing at least 3 amino-hydrogen atoms, suitable for use as curing agent component (III) in the curable resin+curing agent mixtures of this invention belong preferably to the aliphatic or cycloaliphatic series, though also those of the aromatic or araliphatic series may be used.

There may be used polyamines that contain 3 or more secondary amino groups and no primary amino groups, though diprimary or primary-secondary polyamines are preferred.

Suitable aromatic and araliphatic polyamines are, for example, benzidine,
1,2-phenylenediamine,
1,3-phenylenediamine,
1,4-phenylenediamine,
4,4'-diaminodiphenylmethane,
4,4'-diaminodiphenylamine,
4,4'-diaminodiphenyl-dimethylmethane,
4,4'-diaminodiphenylsulphide, -sulphone or -oxide,
4,4'-diaminodiphenylurea,
2,2'-diaminodiphenylmethane,
N-phenylpropylenediamine,
N-2-ethylphenyl-propylenediamine,
N-4-phenylcyclohexyl-ethylenediamine,
bis-β-aminoethyldurane,
bis-β-aminohexyldurene,
1,4-bis-β-aminoethylbenzene,
o-xylylenediamine,
p-xylylenediamine and
m-xylylenediamine.

From among the aliphatic polyamines there may be mentioned, for example, diprimary alkylenepolyamines such, for example, as ethylenediamine, diethylenetriamine, triethylenetetramine, tetraethylenepentamine, pentaethylenehexamine, 1,2-propylenediamine, 1,3-propylenediamine, N-hydroxyalkyl-alkylenepolyamines such, for example, as N-hydroxyethyl-ethylenediamine,
N-hydroxyethyl-pentamethylenediamine,
N-hydroxypropyl-tetramethylenediamine,
N-hydroxyethyl-diethylenetriamine,
N,N''-di-(hydroxyethyl)-diethylenetriamine,
N-hydroxypropyl-diethylenetriamine,
N,N''-di-(hydroxypropyl)-diethylenetriamine,
N-hydroxyethyl-propylenediamine,
N-hydroxypropyl-propylenediamine,
N-hydroxyethyl-dipropylenetriamine.

Preferred use is made of long-chain polyamines of the aliphatic series such as tetramethylenediamine,
pentamethylenediamine,
2-[2-(2-aminoethoxy)-ethoxy]-ethylamine,
butanediol-(1,4)-di-(aminopropyl)-ether,
1,8-diaminooctane,
1,10-diaminodecane,
1,12-diaminododecane and especially hexamethylenediamine and commercial trimethyl-hexamethylenediamine (isomer mixture of 2,2,4-trimethyl - hexamethylenediamine and 2,4,4-trimethylenediamine). Furthermore, it is advantageous to use polyamines of the cycloaliphatic and aliphatic-cycloaliphatic series such as 1,2-diaminocyclohexane,
1,4-diaminocyclohexane,
1,3-diaminocyclohexane,
1,2-diamino-4-ethylcyclohexane,
1,4-diamino-3,6-diethylcyclohexane,
1-cyclohexyl-3,4-diaminocyclohexane,
bis-[methylamino]-cyclohexane-1,4,
dodecahydrobenzidine,
N-cyclohexyl-propylenediamine-1,3,
N-cyclohexyl-ethylenediamine,
N,N'-dicyclohexyl-propylenediamine-1,2,
N,N'-dicyclohexyl-diethylenetriamine,
N,N'-di-[2-ethylcyclohexyl]-propylenediamine,
N,N'-di-(cyclohexylmethyl)-ethylenediamine,
1,8-diaminomethane and especially
4,4'-diaminodicyclohexylmethane,
3,3'-dimethyl-4,4'-diaminodicyclohexylmethane,
2,2-bis(4'-aminocyclohexyl)propane and diamines of the formula

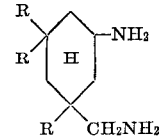

(where R are identical or different alkyls) such as preferably 3-(aminomethyl)-3,5,5-trimethyl-1-cyclohexylamine.

The curable mixtures of this invention are cured to form shaped structures in known manner either at room temperature or with heating, as a rule within the temperature range from 50 to 100° C.

The term "curing" as used in this context describes the conversion of the above-mentioned diepoxides into insoluble and infusible cross-linked products, as a rule with simultaneous shaping to furnish shaped structures such as castings, mouldings or laminates or flat two-dimensional structures such as lacquer films or adhesive bonds.

The curable mixtures of this invention may be admixed at any stage prior to curing with other conventional additives such as fillers, dyestuffs, pigments, flame-proofing agents, mould release agents and the like; suitable extenders and fillers are, for example, glass fibres, carbon fibres, boron fibres, mica, quartz meal, cellulose, burnt kaolin, ground dolomite, colloidal silica having a large specific surface (Aerosil) or metal powders such as aluminium powder.

The importance of the flexibilized curable mixtures of this invention resides both in the electrotechnical sphere, for example as casting or impregnating resins, potting and encapsulating compositions, for example for potting electronic components, and in the mechanical sector, for example as laminating resins or "liners" for vessels and tubes manufactured by winding glass fibres, as adhesives and binders for metal, wood and synthetic materials or as coating or pointing materials for the building industry.

They may further be used with advantage in all technical spheres where conventional curable epoxy resin mixtures are employed, for example also as solvent-free paints, lacquers, dipping resins or moulding compositions.

Percentages in the following examples are by weight.

For the manufacture described in the examples of flexibilized curable epoxy resin mixtures the following disecondary diamines were used.

(1) N,N'-DI-(CYCLOHEXYL)-HEXAMETHYLENEDIAMINE 1160 grams (10 mols) of hexamethylenediamine are mixed with 500 ml. of ethanol and 2160 g. (20 mols+10% excess) of cyclohexanone are added. The resulting exothermic reaction can, if necessary, be rapidly regulated by moderate cooling with ice. The reaction mixture thus obtained is mixed with 50 g. of palladium carbon (10% Pd) and fully hydrogenated at 60° C. under a pressure of 60 atmospheres (gauge). After 3½ hours the hydrogenation is completed. The catalyst is then filtered off and the batch is concentrated until its weight remains constant, finally under a pressure of 0.15 mm. Hg at 85 to 90° C., to yield 2481 g. of a crude product (=89% of theory) having an amine equivalent weight of 141.5 (theory: 140). The crude product is obtained in pure form approximately quantitatively on distillation. It boils at 148 to 150° C. under 0.07 mm. Hg pressure (uncorrected).

*Analysis.*—Calculated for $C_{18}H_{36}N_2$ (percent): C, 77.07; H, 12.94; N, 9.99. Found (percent): C, 77.10; H, 12.90; N, 9.80.

(2) N,N'-DI-(CYCLOPENTYL)-HEXAMETHYLENEDIAMINE 580 grams (5 mols) of hexamethylenediamine are mixed with 500 ml. of ethanol and 924 g. (10 mols+2% excess) of cyclopentanone are added, whereupon a weakly exothermic reaction sets in. 30 grams of palladium carbon (10% Pd) are added to the reaction mixture which is then hydrogenated at 60° C. under a hydrogen pressure of 60 atmospheres (gauge). After 6 hours the absorption of hydrogen ceases, whereupon the catalyst is filtered off and the reaction mixture concentrated and distilled, to yield at 119° C. under 0.03 mm. Hg pressure 908 g. of pure product, corresponding to a yield of 72% of the theoretical.

*Analysis.*—Calculated for $C_{16}H_{32}N_2$ (percent): C, 76.12; H, 12.78; N, 11.10. Found (percent): C, 76.33; H, 12.97; N, 11.27.

(3) N,N'-DI-(CYCLOHEXYL)-2,4,4-(2,2,4)-TRI-METHYL-HEXAMETHYLENEDIAMINE 735 grams (4.68 mols) of commercial trimethyl-hexamethylenediamine (isomer mixture of 2,4,4-trimethyl-hexamethylenediamine and 2,2,4-trimethyl-hexamethylenediamine) are cautiously mixed with 1100 g. (9.38 mols+20% excess) of cyclohexanone, whereupon an exothermic reaction sets in which can be well regulated by cooling with ice. The reaction mixture is mixed with 60 g. of palladium carbon (10% Pd) and fully hydrogenated at 60° C. under a hydrogen pressure of 60 atmospheres (gauge). The hydrogenation is completed after 11 hours. The batch is then filtered, concentrated and the crude product used as it is for curing operations described below.

A specimen was distilled for the analysis; it boiled at 156 to 157° C. under 0.23 mm. Hg pressure (uncorrected).

*Analysis.*—Calculated for $C_{21}H_{42}N_2$ (percent): C, 78.19; H, 13.13; N, 8.69. Found (percent): C, 78.27; H, 13.30; N, 8.40.

(4) N,N'-DI-(CYCLOHEXYL)-POLYPROPYLENE-GLYCOL DIAMINE 135 grams (1 hydroxyl equivalent) of polypropyleneglycol (average molecular weight 250) were mixed in an autoclave with 990 g. (10 mols) of cyclohexylamine and 20 g. of Raney nickel were added. The reaction mixture was then heated under a hydrogen pressure beginning at 20 atmospheres (gauge) for 2 hours at 220° C., during which the pressure rose to 40 atmospheres (gauge) and during the following 6 hours to a maximum of 60 atmospheres (gauge). The reaction was then terminated, and the reaction mixture cooled, detensioned, filtered and then concentrated under a pressure of 0.1 mm. Hg at 80° C. bath temperature until its weight remained constant, to yield 282.5 g. of a crude product having an amine equivalent weight of 204. The product forms a relatively low-viscous, brown liquid.

(5) N,N'-DI-(CYCLOHEXYL)-POLYPROPYLENE-GLYCOL DIAMINE 830 grams (4 hydroxyl equivalents) of polypropyleneglycol (average molecular weight 425) were mixed in an autoclave with 1980 g. (20 mols) of cyclohexylamine and 100 g. of Raney nickel were added. The reaction mixture was then heated for 3 hours at 220° C. under a hydrogen pressure beginning at 20 atmospheres (gauge), during which the pressure rose to 50 and in the course of the following 6 hours to 70 atmospheres (gauge). The temperature was kept throughout at 220° C. The reaction was then discontinued, the reaction mixture cooled, detensioned, filtered and then concentrated under 0.02 mm. Hg pressure at 80° C. bath temperature until its weight remained constant, to yield 1242.5 g. of a crude product having an amine equivalent weight of 258. The product forms a relatively low-viscous, olive-coloured liquid.

Example 1

185 grams of a bisphenol A-diglycidyl ether (I), obtained by condensing epichlorohydrin with bis-(p-hydroxyphenyl)-dimethylmethane (=bisphenol A) in presence of alkali, which is liquid at room temperature and contains 5.35 epoxide equivalents per kg. (=epoxy resin A), were mixed with 84 g. of N,N'-di-(cyclohexyl)-hexamethylenediamine (II) of the formula

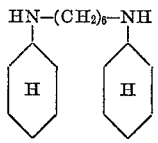

and 22 g. of 3-(aminomethyl)-3,5,5-trimethylcyclohexylamine (III) (corresponding to a ratio of 1.0 epoxide equivalent of epoxy resin A to 0.6 equivalent of amine-hydrogen atom of diamine (II) and 0.5 equivalent of amine-hydrogen atom of diamine (III)), the mixture subjected to a short vacuum treatment to remove the air bubbles and then poured into the moulds maintained at about 50° C. (Plates 135 x 135 x 4 mm. for the flexural and impact strength test. Plates 135 x 135 x 3 mm. for measuring the dielectric loss factor and moulds for tensile test bodies conforming to DIN 16,946 and DIN 53,455 respectively; test mould 2, 4 mm. thick or VSM 77,101 mould 2, 4 mm. thick.) After a heat treatment for 16 hours at 100° C. the mouldings revealed the following properties:

Maximum flexural stress according to VSM 77,103—10.5 kg./mm.$^2$
Deflection according to VSM 77,103—over 19 mm.
Impact strength according to VSM 77,105—over 20 cm./kg./cm.$^2$
Tensile strength according to VSM 77,101—7.30 kg./mm.$^2$
Elongation at rupture according to VSM 77,103—6%.
Dielectric loss factor tg δ
   At 20° C.—0.2%.
   (50 cps.) at 60° C.—0.3%.

When 0.7 equivalent of amine-hydrogen atom of diamine (II) and 0.3 equivalent of amine-hydrogen atom of diamine (III) for every epoxide equivalent of the epoxy resin A under otherwise identical conditions were used, the following properties were found:

Flexural strength according to VSM—10.0 kg./mm.$^2$
Deflection according to VSM—11.7 mm.
Impact strength according to VSM—over 25 cm./kg./cm.$^2$
Tensile strength according to VSM—7.1 kg./mm.$^2$
Elongation at rupture according to VSM—5%

Example 2

156 grams of tetrahydrophthalic acid diglycidyl ester (I) containing 6.4 epoxide equivalents per kg. were mixed with 80.4 g. of N,N'-di-(cyclopentyl)-hexamethylenediamine (II) of the formula

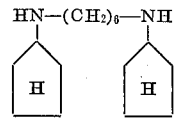

and 21.3 g. of 3 - (aminomethyl) - 3,5,5-trimethylcyclohexylamine (III), corresponding to a ratio of 0.6 equivalent of amine-hydrogen atom of diamine (II) and 0.5 equivalent of amine-hydrogen atom of diamine (III) for every epoxide equivalent of the epoxy compound (I), the mixture evacuated to remove the air bubbles and then poured into tensile body moulds maintained at 50° C. as described in Example 1. After having been cured for 16 hours at 100° C., the test bars revealed the following properties:

Tensile sterngth according to VSM—3.3 kg./mm.$^2$
Elongation at rupture according to VSM—15%
When 28.7 g. of commercial trimethylhexamethylenediamine [isomer mixture of 2,4,4-trimethylhexamethylenediamine and 2,2,4 - trimethylhexamethylenediamine] were used instead of 3-(aminomethyl) - 3,5,5 - trimethylcyclohexylamine (III) under otherwise identical conditions, the mouldings revealed the following properties:

Tensile strength according to VSM—1.1 kg./mm.$^2$
Elongation at rupture according to VSM—87%.

Example 3

154 grams of hexahydrophthalic acid diglycidyl ester (I), containing 6.5 epoxide equivalents per kg., were mixed with 80.5 g. of N,N'-di-(cyclopentyl)-hexamethylenediamine (II) and 19 g. of commercial trimethylhexamethylenediamine (III) [corresponding to a ratio of 0.6 equivalent of amine-hydrogen atom of diamine (II) and 0.5 equivalent of amine-hydrogen atom of diamine (III) for every epoxide equixalent of the epoxy compound (I)], the mixture exacuated to remove the air bubbles (as described in Example 1) and then poured into the heated tensile body moulds. After curing for 16 hours at 100° C. the mouldings revealed the following properties:

Tensile strength according to VSM—2.1 kg./mm.$^2$
Elongation at rupture according to VSM—70%
Viscosity of the resin+curing agent mixture at 20° C.:
   (a) immediately after mixing—120 centipoises
   (b) 1 hour after mixing—140 centipoises.

When 1.1 equivalents of amine-hydrogen atom of diamine (III) [instead of 0.5 equivalent amine-hydrogen atom of diamine (III) and 0.6 equivalent amine-hydrogen atom of diamine (II)] were used under otherwise identical processing conditions, the mouldings revealed the following properties:

Tensile strength according to VSM—2.6 kg./mm.$^2$
Elongation at rupture according to VSM—3%
Viscosity of the resin+curing agent mixture at 20° C.:
   (a) immediately after mixing—150 centipoises
   (b) 1 hour after mixing—210 centipoises.

Example 4

153 grams of adipic acid diglycidyl ester (I), containing 6.53 epoxide equivalents per kg., were mixed with 84 g. of N,N'-di-(cyclohexyl)-hexamethylenediamine (II) and 21.3 g. of 3-(aminomethyl) - 3,5,5 - trimethylcyclohexylamine (III) and the mixture after evacuation to remove the air bubbles poured into the tensile body moulds as described in Example 1. After curing for 16 hours at 100° C. the mouldings revealed the following properties:

Tensile strength according to VSM—0.6 kg./mm.$^2$
Elongation at rupture according to VSM—180%.

Example 5

791 grams of a diglycidyl compound (I) of the following constitution:

(B) $CH_2$—⟨phenyl⟩—NH—CO—(O—$CH_2$—$CH_2$—$CH_2$—$CH_2$)$_x$.O.CONH—⟨phenyl⟩—$CH_3$ NH.CO.O.$CH_2$—$CH_2$—$CH_2$—$CH_2$—O—$CH_2$—CH——$CH_2$
                                                                \O/        NH $CH_2$—CH—$CH_2$.O.$(CH_2)_4$O.CO
                    \O/

(where $x=11$ to 13), containing 1.26 epoxide equivalents per kg. [=epoxy resin B] were mixed with 84 g. of N,N'-di-(cyclohexyl) - hexamethylenediamine (II) and 21.3 g. of 3-(aminomethyl - 3,5,5 - trimethylcyclohexylamine (III) [corresponding to a ratio of 0.6 equivalent of amine-hydrogen atom of diamine (II) and 0.5 equivalent of amine-hydrogen atom of diamine (III) for every epoxide equivalent of the epoxy compound (I)] and after removal of the air bubbles by evacuation the batch was poured into moulds for tensile bodies as described in Example 1. After 16 hours' curing at 100° C. the mouldings revealed the following properties:

Tensile strength according to VSM—0.15 kg./mm.$^2$
Elongation at rupture according to VSM—480%.

Example 6

129.5 grams (=0.7 epoxide equivalent) of the bisphenol A diglycidyl ether used in Example 1 (epoxy resin A) and 241.5 g. (=0.3 epoxide equivalent) of the diglycidyl compounds used in Example 5 (epoxy resin B) are mixed with 98 g. of N,N'-di-(cyclohexyl)-hexamethylenediamine (=0.7 equivalent of amine-hydrogen atom) and 35.8 g. of bis-(4-amino-3-methylcyclohexyl)-methane (=0.6 equivalent of amine-hydrogen atom) at 50° C., the mixture evacuated for a short time to remove the air bubbles and then poured into moulds for tensile bodies as described in Example 1. After 16 hours' curing at 50° C. the mouldings revealed the following properties:

Tensile strength—1.1 kg./mm.$^2$
Elongation at rupture—650%
Viscosity of the resin+curing agent mixture at 50° C.:
   (a) immediately after mixing—1470 centipoises
   (b) 1 hour after mixing—14,400 centipoises.

Example 7

118.8 grams (=0.15 epoxide equivalent) of the diglycidyl compound of Example 5 (epoxy resin B), 140.5 g. (=0.85 epoxide equivalent) of hexahydrophthalic acid diglycidyl ester containing 6.5 epoxide equivalents per kg., 98 g. of N,N-di-(cyclohexyl)-hexamethylenediamine (=0.7 equivalent of amine-hydrogen atom) and 35.8 g. of bis - (4-amino-3-methylcyclohexyl) - methane (=0.6 equivalent of amine-hydrogen atom) were mixed and then heated to 60° C. After a short vacuum treatment to remove the air bubbles the mixture was poured into the tensile body moulds pre-heated at 70° C. After 16 hours' curing at 50° C. the moulding revealed the following properties:

Tensile strength according to VSM—0.58 kg./mm.$^2$
Elongation at rupture according to VSM—540%

When 0.2 epoxide equivalent of epoxy resin B and 0.8 epoxide equivalent of hexahydrophthalic acid diglycidyl ester were used, and the other reactants and the conditions were identical, mouldings were obtained which had the following properties:

Tensile strength according to VSM—0.33 kg./mm.$^2$
Elongation at rupture according to VSM—over 700%

Example 8

140.5 grams (=0.85 epoxide equivalent) of hexahydrophthalic acid diglycidyl ester, containing 6.5 epoxide equivalents per kg., and 120.5 g. (=0.15 epoxide equivalent of a diglycidyl compound of the formula $CH_3$—⟨phenyl⟩—NH—CO—(O—$CH_2$—$CH_2$—$CH_2$)$_x$—(H$_2$—O—CO—NH—⟨phenyl⟩—$CH_3$ NH—CO—O—($CH_2CH_2$—O—)$_2$—$CH_2$—CH——$CH_2$
                                    O           \O/    NH

CH—CH—$CH_2$—O—$CH_2$—$CH_2$—O—$CH_2$—$CH_2$—O—CO (where $x=11$ to 12), containing 1.24 epoxide equivalents per kg. (epoxy resin C) were mixed with 84 g. of N,N' - di - (cyclohexyl) - hexamethylenediamine (=0.6 equivalent of amine-hydrogen atom) and 21.3 g. of 3 - (aminomethyl) - 3,5,5 - trimethylcyclohexylamine (=aminehydrogen equivalent) as 50° C. and the mixture after a short vacuum treatment to remove the air bubbles poured into pre-heated moulds for tensile bodies. After 16 hours' curing at 50° C. the mouldings revealed the following properties:

Tensile strength according to VSM—1.52 kg./mm.$^2$
Elongation at rupture according to VSM—390%

When 0.85 mol of tetrahydrophthalic acid diglycidyl ester instead of hexahydrophthalic acid diglycidyl ester was used, all other conditions being identical, mouldings were obtained which revealed the followed properties:

Tensile strength according to VSM—2.0 kg./mm.$^2$
Elongation at rupture according to VSM—180%
Viscosity of the resin+curing agent mixture at 50° C.:
  (a) immediately after mixing—300 centipoises
  (b) 1 hour after mixing—3000 centipoises Example 9

157 grams (=0.85 epoxide equivalent) of a bisphenol A-diglycidyl ether (epoxy resin A) corresponding to Example 1, 119.6 g. (=0.15 epoxide equivalent of the diglycidyl compound used in example (epoxy resin C), 80.4 g. of N,N'-di-(cyclopentyl)-hexamethylenediamine (=0.6 equivalent amine-hydrogen atom) and 21.3 g. of 3 - (aminomethyl) - 3,5,5 - trimethylcyclohexylamine (=0.5 equivalent of amine-hydrogen atom) were mixed at 50° C., the mixture evacuated for a short time to remove the air bubbles and then poured into pre-heated moulds for tensile bodies. After 16 hours' curing at 50° C. the tensile bodies revealed the following values:

Tensile strength according to VSM—1.6 kg./mm.$^2$
Elongation at rupture—107%

Example 10

(a) 156 grams (=1.0 epoxide equivalent) of tetrahydrophthalic acid diglycidyl ester, containing 6.4 epoxide equivalents per kg., were mixed with 80.4 (=0.6 equivalent amine-hydrogen atom) of N,N'-di-(cyclohexyl)-hexamethylenediamine and 29.7 g. (=0.5 equivalent of amine-hydrogen atom) of commercial trimethylhexamethylenediamine and the mixture after a short vacuum treatment to remove the air bubbles poured into the tensile body moulds as described in Example 1. After 16 hours' curing at 50° C. the mouldings revealed the following properties:

Tensile strength according to VSM—3.00 kg./mm.$^2$
Elongation at rupture according to VSM—28%

(b) For comparison the 80.4 g. (=0.6 equivalent of amine-hydrogen atom) of N,N'-di-(cyclohexyl)-hexamethylenediamine in the above example (a) were replaced by 73.2 g. (=0.6 equivalent of amine-hydrogen atom) of the 1,2-di-(cyclohexylamino)-propane (=N,N'-dicyclohexylpropylenediamine) proposed in German specification No. 1,019,461 as curing agent for epoxy resins. All other conditions as to composition and processing being equal mouldings were obtained which revealed the following properties:

Tensile strength according to VSM—0.80 kg./mm.$^2$
Elongation at rupture—1%

As this comparative experiment shows, the length of the polymethylene chain between the amino groups of the disecondary diamine is of decisive importance to the flexibility of the mouldings.

Example 11

211 g. of a bisphenol A-diglycidyl ether according to Example 1 (=epoxy resin A) and 211 g. of an acid polyester obtained by condensing 11 mols of adipic acid with 10 mols of 1,6-hexanediol at 200 to 220° C., having an acid equivalent weight of 1150 g. were stirred and heated under nitrogen at 140° C. for 2 hours. The adduct (I) had an epoxide equivalent weight of 422 g. 422 grams (=1 epoxide equivalent) of this adduct (I) were thoroughly mixed with 84 g. (=0.6 equivalent of amine-hydrogen atom) of N,N'-di-(cyclohexyl)-hexamethylenediamine and 21.4 g. (=0.5 equivalent of aminehydrogen atom) of 3-(aminomethyl)-3,5,5-trimethylcyclohexylamine at 50° C. and the mixture after a short vacuum treatment to remove the air bubbles poured into the tensile body moulds as described in Example 1. After 16 hours' curing at 80° C. the mouldings revealed the following properties:

Tensile strength according to VSM—0.89 kg./mm.$^2$
Elongation at rupture—270%

Example 12

100 grams (=0.15 epoxide equivalent) of a commercial mixture of isomers, consisting of polyurethanediglycidyl compounds of the formula

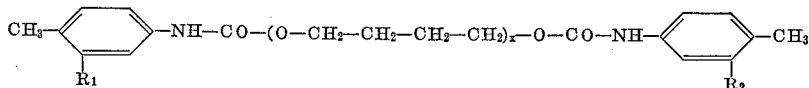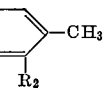

in which $R_1$ or $R_2$ represents the residue (1) 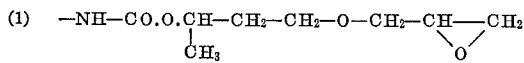

or $R_1$ and $R_2$ each represents the residue (2) 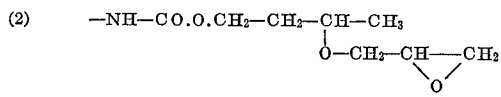

or $R_1$ is —(1) and $R_2$ is —(2), and $x$ is 11, 12 or 13, 133 g. (=0.85 epoxide equivalent) of tetrahydrophthalic acid diglycidyl ester containing 6.4 epoxide equivalents per kg. 86 g. (=0.6 equivalent of amine-hydrogen atom) of N,N'-di(cyclohexyl)-hexamethylenediamine and 21.3 g. (=0.5 equivalent of amine-hydrogen atom) of 3-(aminomethyl)-3,5,5-trimethylcyclohexylamine were thoroughly mixed at 50° C. and the mixture after a short vacuum treatment to remove the air bubbles poured into the pre-heated tensile body moulds as described in Example 1. After 16 hours' curing at 50° C. the mouldings revealed the following properties:

Tensile strength—2.2 kg./mm.$^2$
Elogation at rupture—410%

Example 13

156 grams (=1 epoxide equivalent) of a tetrahydrophthailc acid diglycidyl ester containing 6.4 epoxide equivalents per kg. were thoroughly mixed with 100.5 g. (=0.6 equivalent of amine-hydrogen atom) of N,N'-di - (cyclohexyl) - 2,2,4(2,4,4,)-trimethylhexamethylenediamine and 29.7 g. (=0.5 epoxide equivalent of amine-hydrogen atom) of commercial trimethylhexamethylenediamine and the mixture after a short vacuum treatment to remove the air bubbles poured into the tensile body moulds described in Example 1. After 16 hours' heat-treatment at 80° C. mouldings of high toughness were obtained. The resin+curing agent mixture described above was also used for coating aluminium surfaces which after been cured in a similar manner revealed excellent adhesion.

Example 14

156 grams (=1 epoxide equivalent) of a tetrahydrophthalic acid diglycidyl ester containing 6.4 epoxide equivalents per kg. were heated to 40° C. with 88.2 g. (=0.6 equivalent of amine-hydrogen atom) of N,N'-di - (cyclopentyl) - hexamethylenediamine and 12.2 g. (=0.5 equivalent of amine-hydrogen atom) of triethylenetetramine and thoroughly mixed. After a short vacuum treatment to remove the air bubbles, the mixture was poured into the tensile body moulds described in Example 1. After 16 hours' curing at 90° C., the flexible mouldings revealed the following properties:

Tensile strength according to VSM—1.11 kg./mm.$^2$
Elongation at rupture according to VSM—70%

Example 15

22.3 grams (=1 epoxide equivalent) of the diglycidyl compound of the constitution

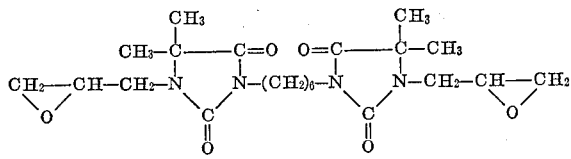

containing 4.45 epoxide equivalents per kg., were heated to 40° C. with 75.6 g. (=0.6 equivalent of amine-hydrogen atom) of N,N'-di-(cyclopentyl)-hexamethylenediamine (isomer mixture of 2,4,4-trimethylhexamethylenediamine and 2,2,4 - trimethylhexamethylenediamine; 0.5 equivalent of amine-hydrogen atom) and thoroughly mixed. After a short vacuum treatment to remove the air bubbles the mixture was poured into the pre-heated tensile body moulds described in Example 1. After 16 hours' curing at 90° C. the mouldings revealed the following properties:

Tensile strength according to VSM—1.56 kg./mm.$^2$
Elongation at rupture according to VSM—130%

Example 16

109 grams of the epoxy resin A of Example 1 were heated for 3 hours at 140° C. with 109 g. of an acid polyester of sebacic acid and neopentylglycol, acid equivalent weight 1070 g. (obtained by heating 11 mols of sebacic acid with 10 mols of neopentylglycol at 140 to 180° C.) to form an adduct containing 2.3 epoxide equivalents per kg. 218 g. of this adduct together with another 92.5 g. of epoxy resin A are heated to 90° C. and thoroughly mixed with 122 g. of N,N'-di-(cyclohexyl) - polypropyleneglycol diamine (obtained as described under 4 from polypropyleneglycol of average molecular weight 250 and cyclohexylamine under hydrogenating conditions) and 21.3 g. of 3-aminomethyl-3,5,5-trimethylcyclohexylamine (corresponding to a ratio of 0.6 equivalent of active hydrogen of the disecondary amine and 0.5 equivalent of active hydrogen of the diprimary amine for every equivalent of epoxide group) and the mixture is poured into the tensile body moulds described in Example 1. After 16 hours' curing at 90° C. the mouldings revealed the following properties:

Tensile strength according to VSM—0.75 kg./mm.$^2$
Elongation at rupture according to VSM—147%

Example 17

185 grams of the epoxy resin A of Example 1 were thoroughly mixed at 80° C. with 154.5 g. of N,N'-di-(cyclohexyl)-polypropyleneglycol diamine (prepared as described under 5 from polypropyleneglycol of average molecular weight 425 and cyclohexylamine under hydrogenating conditions) and 21.3 g. of aminomethyl-3,5-trimethylcyclohexylamine (corresponding to a ratio of 0.6 equivalent of active hydrogen of the disecondary amine and 0.5 equivalent of active hydrogen of the diprimary amine for every equivalent of epoxide groups), and after a short vacuum treatment the mixture was poured into the pre-heated moulds described in Example 1. After 10 hours' curing at 80° C. the mouldings revealed the following properties:

Tensile strength according to VSM—1.20 kg./mm.$^2$
Elongation at rupture according to VSM—180%

Example 18

439 grams of the adduct described in Example 16 of epoxy resin A and sebacic acid-neopentylglycol polyester (=1.0 epoxide equivalent) were heated to 110° C. and thoroughly mixed with a mixture of 84 g. (=0.6 equivalent of amine-hydrogen atom) of N,N'-di-(cyclohexyl)-hexamethylenediamine and 21.3 g. (=0.5 equivalent of amine-hydrogen atom) of 3-aminomethyl-3,5,5-trimethylcyclohexylamine. After a short vacuum treatment the mixture was poured into the pre-heated moulds described in Example 1. After 16 hours' curing at 90° C. the mouldings revealed the following properties:

Tensile strength according to VSM—1.40 kg./mm.$^2$
Elongation at rupture according to VSM—300%

We claim:
1. A curable epoxy resin composition which comprises (I) a diepoxy compound containing two 1,2-epoxyethyl residues, (II) a disecondary diamine of the formula

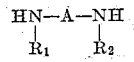

in an amount of 0.3 to 0.9 equivalent of active hydrogen atoms linked with nitrogen for every equivalent of epoxide groups of the diepoxy compound (I), and in this formula $R_1$ and $R_2$ each represents a member selected from the group consisting of an unsubstituted saturated carbocyclic ring containing at least 5 and at most 6 endocyclic carbon atoms, and an alkyl substituted carbocyclic ring containing at least 5 and at most 6 endocyclic carbon atoms, and A represents a member selected from the group consisting of an unsubstituted polymethylene residue, an alkyl substituted polymethylene residue, an unsubstituted poly(oxypolymethylene) residue and an alkyl substituted poly(oxypolymethylene) residue which contain in the linear chain directly connecting the two secondary nitrogen atoms at least 4 carbon atoms, and (III) a polyamine, which contains at least 3 active hydrogen atoms linked with nitrogen in an amount of 0.2 to 0.8 equivalent of active hydrogen atoms linked with nitrogen for every epoxide equivalent of the diepoxy compound (I).

2. A curable epoxy resin composition which comprises (I) a diepoxy compound containing two 1,2-epoxyethyl residues, (II) a disecondary diamine of the formula

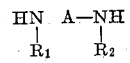

in an amount of 0.5 to 0.8 equivalent of active hydrogen atoms linked with nitrogen for every equivalent of epoxide groups of the diepoxy compound (I), and in this formula $R_1$ and $R_2$ each represents a member selected from the group consisting of an unsubstituted saturated carbocyclic ring containing at least 5 and at most 6 endocyclic carbon atoms and an alkyl substituted carbocyclic ring containing at least 5 and at most 6 endocyclic carbon atoms, and A represents a member selected from the group consisting of an unsubstituted polymethylene residue, an alkyl substituted polymethylene residue, an unsubstituted poly(oxypolymethylene) residue and an alkyl substituted poly(oxypolymethylene) residue which contain in the linear chain directly connecting the two secondary nitrogen atoms at least 6 carbon atoms, and (III) a polyamine, which contains at least 3 active hydrogen atoms linked with nitrogen, in an amount of 0.4 to 0.6 equivalent of active hydrogen atoms linked with nitrogen for every epoxide equivalent of the diepoxy compound (I).

3. A curable epoxy resin composition according to claim 1, comprising (I) a diepoxy compound containing two 1,2-epoxyethyl residues, (II) a disecondary diamine of the formula $$HN-A'-NH$$
$$\phantom{HN-}|\phantom{A'-}|$$
$$\phantom{HN-}R_1\phantom{A'}R_2$$

in an amount of 0.3 to 0.9 equivalent of active hydrogen atoms linked with nitrogen for every equivalent of epoxide groups of the diepoxy compound (I), and in this formula $R_1$ and $R_2$ each represents a member selected from the group consisting of an unsubstituted saturated carbocyclic ring containing at least 5 and at most 6 endocyclic carbon atoms and an alkyl substituted carbocyclic ring containing at least 5 and at most 6 endocyclic carbon atoms and A' represents a polyglycol residue which is obtained by removal of the terminal hydroxyl groups and which contains in the linear chain directly connecting the two secondary nitrogen atoms at least 4 carbon atoms, and (III) a polyamine, which contains at least 3 active hydrogen atoms linked with nitrogen, in an amount of 0.2 to 0.8 equivalent of active hydrogen atoms linked with nitrogen for every epoxide equivalent of the diepoxy compound (I).

4. A curable epoxy resin composition according to claim 1, comprising (I) a diepoxy compound containing two 1,2-epoxyethyl residues, (II) a disecondary diamine of the formula $$HN-A'-NH$$
$$\phantom{HN-}|\phantom{A'-}|$$
$$\phantom{HN-}R_1\phantom{A'}R_2$$

in an amount of 0.5 to 0.8 equivalent of active hydrogen atoms linked with nitrogen for every equivalent of epoxide groups of the diepoxy compound (I), and in this formula $R_1$ and $R_2$ each represents a member selected from the group consisting of an unsubstituted saturated carbocyclic ring containing at least 5 and at most 6 endocyclic carbon atoms and an alkyl substituted carbocyclic ring containing at least 5 and at most 6 endocyclic carbon atoms and A' represents a polyglycol residue which is obtained by removal of the terminal hydroxyl groups and which contains in the linear chain directly connecting the two secondary nitrogen atoms at least 6 carbon atoms, and (III) a polyamine, which contains at least 3 active hydrogen atoms linked with nitrogen, in an amount of 0.4 to 0.6 equivalent of active hydrogen atoms linked with nitrogen for every epoxide equivalent of the diepoxy compound (I).

5. An epoxy resin composition according to claim 1 comprising as diepoxy compound (I) a diglycidyl compound.

6. An epoxy resin composition according to claim 1 comprising as diglycidyl compound the diglycidyl ether of a diphenyl.

7. An epoxy resin composition according to claim 1 comprising as diglycidyl compound the diglycidyl ester of a dicarboxylic acid.

8. An epoxy resin composition according to claim 1, comprising as diglycidyl compound an adduct of (a) a stoichiometric excess of a member selected from the group consisting of a diphenol diglycidyl ether and a dicarboxylic acid diglycidyl ester and (b) an acid aliphatic polyester containing two terminal carboxyl groups.

9. An epoxy resin composition according to claim 1 comprising as diepoxy compound (I) a compound of the formula

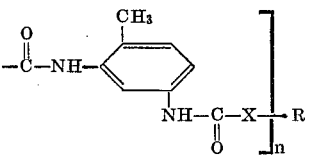

in which $n$ is an integer of at least 2 and at most 3, X represents a member selected from the group consisting of an oxygen and a sulphur atom, R is a member selected from the group consisting of an n-valent aliphatic hydrocarbon residue, an n-valent aliphatic hydrocarbon residue interrupted by oxygen atoms, an n-valent hydrocarbon residue interrupted by sulphur atoms and n-valent aliphatic hydrocarbon residue interrupted by carboxylic acid ester groups, A represents a member selected from the group consisting of the residue obtained by removing the terminal hydroxyl groups from a glycol, the residue obtained by removing the terminal hydroxyl groups from a polyglycol, the residue obtained by removing the terminal hydroxyl groups from a thiodiglycol and the residue obtained by removing the terminal hydroxyl groups from a poly(thio)diglycol, $m$ represents an integer of at least 1 and at most 2 and $p$ represents an integer of at least 1 and at most 2.

10. An epoxy resin composition according to claim 1 comprising as disecondary diamine a diamine of the formula

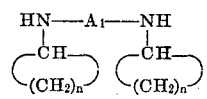

in which $A_1$ represents a member selected from the group consisting of an unsubstituted hexamethylene residue and a methyl substituted hexamethylene residue and $n$ is an integer of at least 4 and at most 5.

11. An epoxy resin composition according to claim 10 comprising as disecondary diamine N,N'-di-(cyclohexyl)-hexamethylenediamine.

12. An epoxy resin composition according to claim 10 comprising as disecondary diamine N,N'-di-(cyclopentyl)-hexamethylenediamine.

13. An epoxy resin composition according to claim 10 comprising as disecondary diamine a member selected from the group consisting of N,N'-dicyclohexyl-2,4,4-trimethyl-hexamethylene-diamine and/or N,N'-dicyclohexyl-2,2,4-trimethylhexamethylenediamine.

14. An epoxy resin composition according to claim 10 comprising as disecondary diamine an N,N'-di-(cyclohexyl)-polypropyleneglycol diamine.

15. An epoxy resin composition according to claim 1, in which the polyamine containing at least 3 active hydrogen atoms linked with nitrogen is a diprimary polyamine.

16. An epoxy resin composition according to claim 15 comprising as diprimary polyamine a cycloaliphatic diprimary polyamine.

17. An epoxy resin composition according to claim 15 comprising as cycloaliphatic diprimary polyamine 2,2-bis-(4-aminocyclohexyl)-propane.

18. An epoxy resin composition according to claim 15 comprising 3 - (aminomethyl)-3,5,5-trimethyl-cyclohexyl-amine as cycloaliphatic diprimary polyamine.

19. An epoxy resin composition according to claim 15 comprising as diprimary polyamine hexamethylenediamine or commercial trimethylhexamethylene diamine (isomer mixture of 2,4,4 - trimethyl - hexamethylenediamine and 2,2,4-trimethylhexamethylenediamine).

References Cited

UNITED STATES PATENTS 2,642,412  6/1953  Newey et al. _____ 260—47
2,817,644  12/1957  Shokal et al. _____ 260—47

WILLIAM H. SHORT, Primary Examiner
E. NIELSEN, Assistant Examiner

U.S. Cl. X.R.

260—2, 78.4

CASE 6188/6244/E

PO-1050
(5/69)

UNITED STATES PATENT OFFICE
CERTIFICATE OF CORRECTION

Patent No. 3,519,603                 Dated July 7, 1970

Inventor(s) FRIEDRICH LOHSE ET AL

It is certified that error appears in the above-identified patent and that said Letters Patent are hereby corrected as shown below:

Column 18, the right hand side of the formula in claim 9 should read:

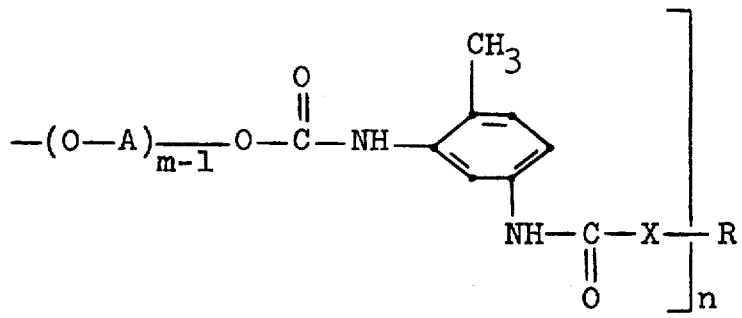

Signed and sealed this 11th day of May 1971.

(SEAL)
Attest:

EDWARD M. FLETCHER, JR.
Attesting Officer

WILLIAM E. SCHUYLER, JR.
Commissioner of Patents